US005551020A

United States Patent [19]
Flax et al.

[11] Patent Number: 5,551,020
[45] Date of Patent: Aug. 27, 1996

[54] SYSTEM FOR THE COMPACTING AND LOGICAL LINKING OF DATA BLOCKS IN FILES TO OPTIMIZE AVAILABLE PHYSICAL STORAGE

[75] Inventors: Stephen W. Flax, Wauwatosa; Dennis E. Bahr, Middleton, both of Wis.

[73] Assignee: Flextech Systems, Inc., Brookfield, Wis.

[21] Appl. No.: 219,027

[22] Filed: Mar. 28, 1994

[51] Int. Cl.$^6$ .................................................. G06F 17/30
[52] U.S. Cl. .................. 395/600; 395/850; 364/DIG. 1; 364/222.81; 364/245; 364/246; 364/260.7; 364/283.1
[58] Field of Search .................................... 395/600, 850

[56] References Cited

U.S. PATENT DOCUMENTS

| | | | |
|---|---|---|---|
| 5,021,946 | 6/1991 | Korty | 364/200 |
| 5,034,914 | 7/1991 | Osterlund | 364/900 |
| 5,131,087 | 7/1992 | Warr | 395/425 |
| 5,155,484 | 10/1992 | Chambers, IV | 341/155 |
| 5,203,387 | 4/1993 | Howlett et al. | 141/103 |
| 5,212,794 | 5/1993 | Pettis et al. | 395/700 |
| 5,237,681 | 8/1993 | Kagan et al. | 395/600 |
| 5,247,646 | 9/1993 | Osterlund et al. | 395/425 |
| 5,371,885 | 12/1994 | Letwin | 395/600 |
| 5,384,643 | 1/1995 | Inga et al. | 358/403 |
| 5,422,762 | 6/1995 | Jerbic | 360/48 |
| 5,454,101 | 9/1995 | MacKay et al. | 395/600 |

*Primary Examiner*—Wayne Amsbury
*Attorney, Agent, or Firm*—Whyte Hirschboeck Dudek S.C.

[57] ABSTRACT

The present invention is a method of processing and writing data to a database wherein the method comprises four broad steps: 1) manipulating data files into a more compact and efficient bit-encoded form and preparing the files to receive additional data to link the files; 2) linking the files with pointers to form an overall data structure; 3) determining the potential physical memory address for the files' data by optimizing available memory space for a given memory media wherein the files are partitioned into blocks of data which are sufficiently inclusive to permit retrieval of all required data with a single memory media read, yet small enough to allow all of the physical memory space to be fully utilized; and 4) generating reference tables to be interspersed with the data blocks wherein the reference tables track the physical location of related data, obviating the need for additional disk reads. The invention further comprises a system wherein said method is performed on a database contained on a first computer system so that the database can be written to a memory media of fixed size which can be used with a second computer system, such that memory access speed is enhanced, the density of information stored on the memory media is increased, yet the computational power needed to retrieve such information is reduced.

20 Claims, 3 Drawing Sheets

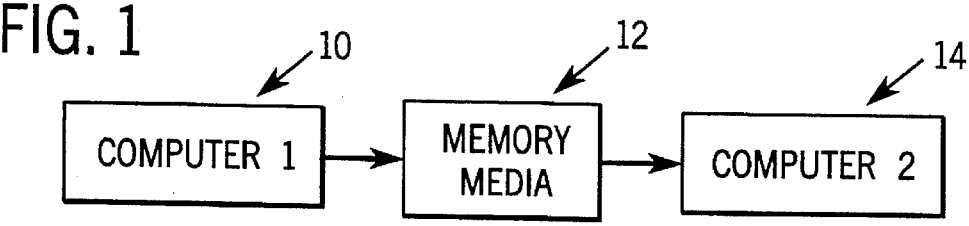
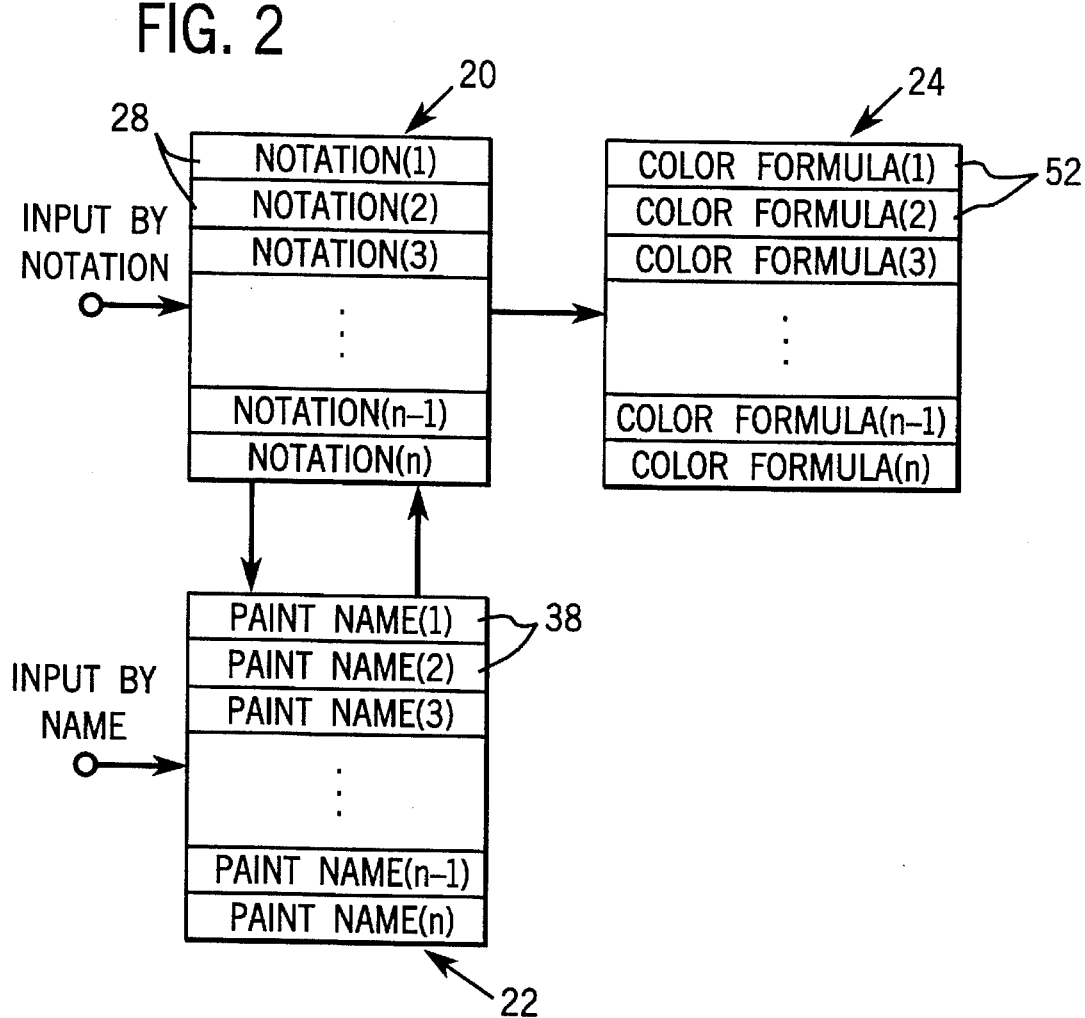

SYSTEM FOR THE COMPACTING AND LOGICAL LINKING OF DATA BLOCKS IN FILES TO OPTIMIZE AVAILABLE PHYSICAL STORAGE

FIELD OF THE INVENTION

This invention relates to computer systems and, more particularly, to an improved method of compressing, organizing, and encoding large data structures which can subsequently be utilized efficiently and easily in computers having only rudimentary capabilities.

BACKGROUND OF THE INVENTION

Organizing and referencing large amounts of data has been a problem which has faced mankind for centuries. With the development and wide-spread availability of computers, the task of processing, organizing and referencing these large amounts of data has been dramatically simplified.

Significant computer power is often required to organize and process some particularly large or complex data structures. Conventional computing systems typically include a high-speed, central processing unit (CPU), read-only memory (ROM) containing the computer's basic input/output system (BIOS), random access memory (RAM) for temporarily storing data and executing programs, and usually some type of memory storage media such as a hard disk drive on which programs and data are stored when not in use. Further, the computing system may contain extended RAM, arithmetic processors, various levels of cache memory and other system accelerators all designed to enhance the computer's computational and processing capabilities. Additionally, the computing system may contain various expansion slots and ports for communication with peripheral devices such as monitors and printers. The overall computing system, therefore, has the capability of receiving data, storing or retrieving data, processing data through the application of various algorithms and programs, and outputting data.

On a typical computing system, data can be permanently stored on memory media such that the data is not lost when the system is powered down or not in use. The most common form of permanent storage is through magnetic storage media such as magnetic disks. Magnetic disks are generally available either as a hard disks or removable "floppy" disks. Floppy disks are desirable because they are transportable, inexpensive and capable of use with a variety of systems. However, floppy disks generally lack the large storage capacity of their hard counterparts and require comparatively more time to store and retrieve data. Hard disks, on the other hand, can store and retrieve data quickly and have the capacity to store large amounts of data. However, hard disks are generally not portable.

Despite their differences, both types of magnetic disks utilize a common notation for storing data and a similar system for filing the data so that it can be retrieved. The language in which all data is recorded on the magnetic disks is binary, which is simply an arrangement of 1s and 0s. The surface of any magnetic disk is divided into microscopic areas which can be altered so that the areas represent either the character 1 or the character 0. Each character is referred to as a bit. Eight bits comprise a byte. Additionally, magnetic disks are also divided up by larger areas. These larger areas allow the computing system to process and organize data in an orderly manner. Magnetic codes are embedded in the surface of the disks to divide the surface up into sectors and tracks. The number of sectors and tracks that fit on a disk determines the disk capacity. Further, sectors may be designated as elements which comprise clusters. Clusters are logical units of memory which vary in size from a single sector to many sectors combined in sequence. Two or more sectors which comprise a cluster must be physically adjacent on the memory media.

However, once data is processed and organized on a storage media, the same level of computational power and ability of the computing system may no longer be required. In other words, when a user wants to perform a simple task, such as browsing a previously organized database, this task may be accomplished with a much smaller, and typically less expensive, computing system with little decrease in performance. Accordingly, one object of this invention is to provide a method for preparing data on a first computer for use on a second computer, wherein the second computer is a comparatively inexpensive and provides only simple, rudimentary computing capacity including reading, translating, and presenting data.

Another characteristic common to conventional computing systems having data storage media is the binary form in which data is written to the database. As mentioned above, all data must be represented in some binary form to be manipulated by computers. Most computers utilize ASCII as the standard code for representing characters as binary numbers. In this form, a binary number containing eight digits is used to represent each character. Therefore, eight bits, i.e., one byte, of memory is required to store each character in ASCII form. However, data can be represented in other encoded forms, such as binary coded decimal (BCD), which require fewer bits to represent each character. A memory space savings can be realized by converting data to a form which requires fewer bits. Therefore, by constructing and utilizing such other forms of data representation, a smaller portion of memory is required to store a finite quantity of data than would be required if the data were written in ASCII form.

Another characteristic common to conventional computing systems utilizing a file system is that the computing systems often allocate entire database files to pre-allocated units of memory even though the file does not require the full amount of space allocated. As mentioned above, two or more adjacent sectors can be designated as a cluster. The memory capacity of the memory media dictates in part the degree of clustering, such that in some computing systems, a cluster represents the minimum logical unit of storage for the memory media. Therefore, it is possible that even though a file may have a size of only 1 byte of data, an entire cluster which is made of many bytes may be allocated for storage of the file. This type of data storage is inefficient since it may not utilize the full memory space available in each cluster. Although this practice is suitable for systems with large amounts of memory space, it is not a desirable practice for systems which have very limited amounts of memory space.

In this same vein, conventional computing systems often write a large file's data to several clusters located in different areas of the database, while maintaining a record of the logical order of the clusters. Physical addressing is a technique which specifically addresses a particular track and sector of the memory media. Logical addressing is a method wherein the computing system writes single files to multiple clusters located in separate, non-contiguous ares of the database and tracks the files by the address of each cluster. Therefore, when a logically stored file is retrieved, the read/write head of the system must continually jump between clusters. These jumps are time consuming and inefficient because the head must physically move across the disk to retrieve a file. It would be much more desirable to devise a method of data storage which utilizes contiguous physical files such that a read/write head could retrieve an entire file without the need for jumps.

Still yet another characteristic present in many databases is the use of fixed length fields to store data. A common method for storing data is to allocate a predetermined number of bytes in the database for each character string. The size of each memory space is determined by the length of the longest character string, such that each character string is allocated the same amount of space. In essence, the database is divided up based on the number of character strings into equal segments, with the longest character string determining the length or number of bits to be present in each segment. The character strings are written to the predetermined locations for each segment even though the character string does not require all of the bits assigned to its particular segment. This method is inefficient in that it does not utilize all the available memory space if a character string requires less than all the bits allocated. Since the length of each segment is fixed and each segment is located at a predetermined address, the bytes which are not used are essentially wasted. Therefore, it is desirable to utilize a method of data storage which is dynamic in its allocation of memory space for character strings within a particular field. The size of each space for character strings within a field should be a function of the individual character strings.

Another technique often employed by conventional computing systems is the use of file system mapping to keep a record of both the location of a file as well as the location of individual clusters making up the file. All of this data is usually contained in a single fixed location in the database, typically at the beginning of the database, in a file allocation table (FAT). The FAT is where the information about the disk's directory structure and what clusters are used to store files. Each time a file is read, the operating system must first move the read/write head to the database's FAT to determine in which clusters a preexisting file begins and the address, i.e., track and sector, of that cluster. If the clusters of a file are not adjacent on the same track, the read/write head must move back to the FAT each time an additional cluster in the file is to be read. Moving back to the FAT in this manner to determine the subsequent address of a cluster is time consuming and inefficient. It would be desirable to provide a method of data storage that minimizes the use of a file allocation table by including address data concerning a file within the file itself, precluding the need to refer back to a central file allocation table.

In computing systems which utilize some or all of the above mentioned hardware and data management techniques, it is generally recognized that read times and seek times are directly proportional to the expense of the computing system, such that the more expensive the system, the faster the data can be addressed and retrieved. However, as the cost of the computing systems decreases, data addressing and retrieval efficiency is also sacrificed. This is especially true of rudimentary computing systems which are utilized with large databases.

Therefore, the need exists for a method and a system in which a computer of greatly reduced capability can utilize large amounts of data in an already processed and organized form in order to present the data in a simple, efficient, and highly useful form. While it is obvious that a computer with normal computational capabilities could also easily achieve this task, such a method and system would provide a much more efficient and cost effective way to accomplish the information dissemination task by pairing a single high level computer (used for generating the required data base through processing, encoding, compressing, organizing, and referencing data) with multiple, inexpensive and simple rudimentary computers capable of reading, translating, and presenting the data.

SUMMARY OF THE INVENTION

The present invention comprises a method for processing, encoding, compressing, organizing and referencing large amounts of data and a system wherein said method is performed on a first computer system for use with a second computer system, such that memory access speed is enhanced, the density of information stored in a database of fixed size is increased, yet the computational power needed to retrieve such information is reduced. The present invention will provide a compact and efficient database storage and retrieval method for computer systems compared to the traditional methods of storing and retrieving information on databases. In addition, the present invention will process and store large amounts of data for retrieval on rudimentary systems, wherein such rudimentary systems would not ordinarily have the memory capacity to store and retrieve such data if stored on memory media using traditional methods of storage.

In accordance with the invention, a method of processing and writing data to a database is provided wherein the method comprises four broad steps: 1) manipulating data files into a more compact and efficient bit-encoded form and preparing the files to receive additional data to link the files; 2) linking the files with pointers to form an overall data structure; 3) determining the potential physical memory address for the files' data by optimizing available memory space for a given memory media wherein the files are partitioned into blocks of data which are sufficiently inclusive to permit retrieval of all required data with a single memory media read, yet small enough to allow all of the physical memory space to be fully utilized; and 4) generating reference tables to be interspersed with the data blocks wherein the reference tables track the physical location of related data, obviating the need for additional disk reads.

The system for applying the above described method employs a first computer of sufficiently large memory capacity and computing capabilities to execute the method. The processed data is written to memory media which may be utilized by a second computer. The second computer is of comparatively limited memory capacity and computing capabilities, and is intended primarily as a means for retrieving and printing the processed data.

More specifically, the data is manipulated by a series of steps comprising ordering the data of a file in a logical manner, such as alphabetically or numerically and, if necessary, creating index tables to track the re-ordered data; encoding the data from ASCII form into a binary form which requires fewer bits of memory to store the data, wherein encoding can be accomplished either through the use of translation formulas or pre-determined translation tables for alphabetic data and a more efficient binary form, such as BCD, for numeric data; compressing the data into continuous data strings, wherein individual segments of data are separated by delineators and a sub-table is generated at the beginning of the data to record the location of individual segments within the compressed string; and organizing data within strings by forming groups of data having similar characters such that the similar characters are written to the database a minimum number of times, reducing repetition and thus saving memory space.

BRIEF DESCRIPTION OF THE DRAWINGS

The invention will be better understood if reference is made to the accompanying drawings, in which:

FIG. 1 is an illustration of the overall system as it is contemplated in the preferred embodiment.

FIG. 2 is a system block diagram of the method of the present invention as it applied to a database containing paint names and formulas.

DETAILED DESCRIPTION OF THE PREFERRED EMBODIMENT

Figure 3:
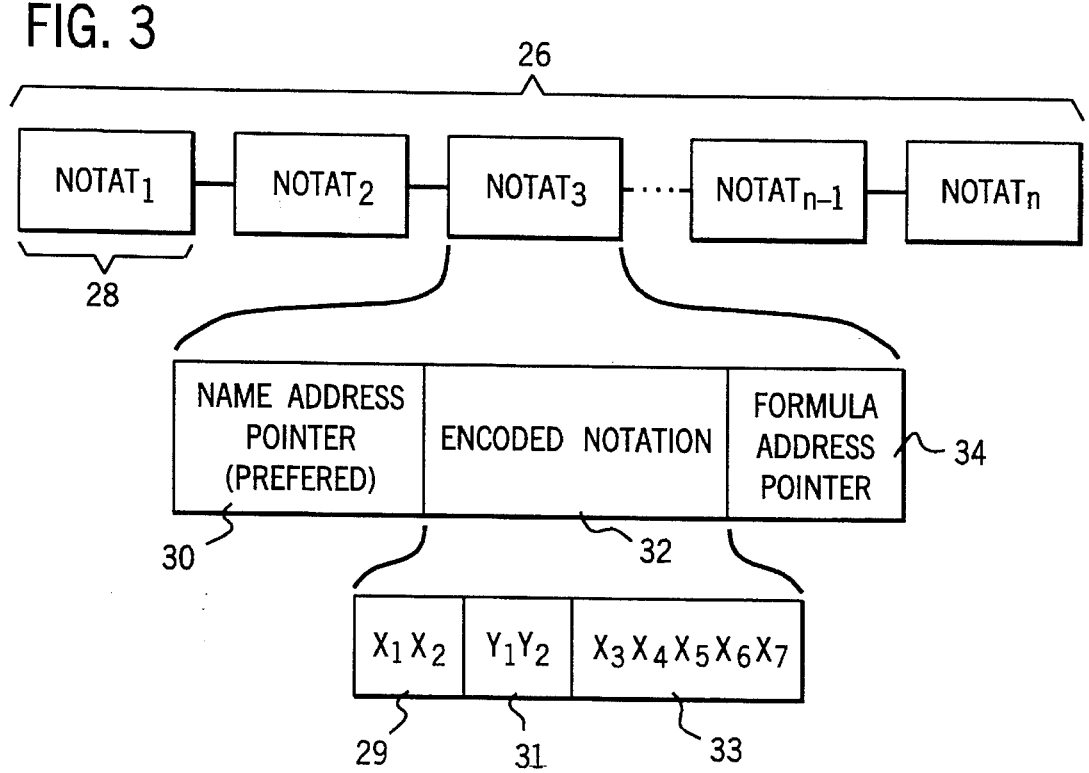
FIG. 3 is a block diagram of the paint notation table structure.

Reference should be made to FIG. 1 for an overview of the system of the invention. A first computer 10 is provided for applying the method of the present invention to large databases. The processed database is written to memory media 12 for use on a second computer 14. Memory media 12 can be any conventional data storage device such as magnetic hard disks, optical disks or magnetic floppy disks. In the preferred embodiment, second computer 14 is of limited computing capacity, in that it is intended only to read compressed data from memory media 12, expand the compressed data, and print the data to an output device (not shown) which can either be incorporated into second computer 14 or a stand alone device. First computer 10 must be of sufficient memory capacity and computing capability to store data into a non-compressed binary form, such as ASCII, and apply the method described herein. The method is used to process and write large binary databases to memory media 12 which otherwise would not be of sufficient capacity to receive the data in non-compressed binary form.

In order to manipulate and write data to memory media 12, the present invention comprises a method for processing, encoding, compressing, organizing and referencing the data. The method can be broken down into four broad steps: 1) manipulating data files into a more compact and efficient bit-encoded form and preparing the files to receive additional data to link the files; 2) linking the files with pointers to form an overall data structure; 3) determining the potential physical memory address for the files' data by optimizing available memory space for a given memory media wherein the files are partitioned into blocks of data which are sufficiently inclusive to permit retrieval of all required data with a single memory media read, yet small enough to allow all of the physical memory space to be fully utilized; and 4) generating reference tables to be interspersed with the data blocks wherein the reference tables track the physical location of related data, obviating the need for additional disk reads. The need for each step may not always be necessary and is dictated by the characteristics of the data, such as the number of files and the quantity of data.

Turning to the first step of the process, data is manipulated by a series of techniques which can include ordering the data, encoding the data, compressing the data into encoded strings; and organizing groups of data within strings. Ordering is accomplished by arranging the data into a predetermined sequence. The sequence may be numerical, alphabetical, or based on some other logical arrangement. To further facilitate ordering, the data may be grouped into significant sets before ordering. These sets typically will be based on the relatedness of certain data. Additionally, as ordering is taking place tables may be generated which relate the ordered data to other data or external factors. For example, ten pre-determined groups may be arranged for receiving data, yet each group may not necessarily receive data. Therefore, some groups may be "empty", i.e., containing no data. If the data is arranged consecutively, a table may be necessary to track the groups and the relative position of the data.

Encoding the data involves transforming the data from its non-compressed binary form into a binary form which requires fewer bytes of memory to store the data. Encoding results in bit compressions which can significantly reduce the amount of memory required to store the encoded data. Encoding can be accomplished either through the use of translation formulas, pre-determined translation tables or the transformation to more efficient binary forms. The specific method of encoding utilized depends on the type of data to be encoded. Alphabetic and symbolic data is most suited for encoding by way of translation formulas or pre-determined translation tables. Using ASCII data as an example, a single, lower case, alphabetic ASCII character typically requires eight bits of memory space to store. If the entire alphabet is contemplated, then each letter can be assigned a number to represent the character, such as "a=0", "b=1", "c=2" . . . "z=25." The number 25 requires five bits when converted to binary form. Thus a savings of three bits, i.e., eight bits minus five bits, is realized by converting from ASCII binary form to an encoded binary form.

Additionally, if a smaller number of letters is to be used, the effects of encoding may be even greater. For example, if only nine alphabetic characters appear in the data, then only a four bit binary number need be used to represent all of the characters. Thus, the first character is assigned the number zero, the second character is assigned the number one and eventually the ninth character is assigned the number eight. Because the number eight requires only four bits when converted to binary form, the resulting savings is four bits, i.e., eight bits minus four bits, per alphabetic character. Furthermore, this same method can be used for any character or group of characters. For example, if a database consists of nine frequently used words, then each word can be assigned a number ranging from zero to eight. In this way, the bit savings is further increased because the entire word written in ASCII would have a bit count of at least eight bits, and likely a much larger, while the bit count for the word represented in the encoded binary form would still be four. Therefore, the greater the number of characters in each group, the greater the potential bit savings that can be accomplished by encoding.

Encoding numeric data is very similar to the process described above. Although other methods of encoding numeric data may be utilized without departing from the spirit of the invention, the preferred embodiment utilizes binary coded decimal (BCD) as the means for converting numeric data ranging from zero to nine in ASCII form to a binary form which requires smaller bit counts to represent numbers. Again, in ASCII, these numeric characters require at least eight bits of memory space to store each character. However, by converting numeric characters in this range to BCD form, the numbers can be stored in memory using only four bits. Therefore, encoding numeric data in the range from zero to nine results in a savings of four, i.e., eight minus four, bits per numeric character. This same theory can be applied to numbers larger than nine, however, the value of the number will effect the exact bit savings realized by converting from ASCII to BCD form.

Once a file has been encoded, the encoded data in that file is compressed into a single, continuous data string so that individual segments of data are sequentially packed. To accomplish this, additional information may be appended to each segment before it is compressed. Specifically, at least one delineator, or flag, is may be required to distinguish between the end of one segment and the beginning of another segment. As is further explained below, the delineator may also serve as a pointer to some other address in the database. The delineator may also be used to record other information about the data with which it is used. For example, if the individual data segments are of variable size, then the delineator may be used to track the size of its corresponding data segment so that the computer knows the length of the next data segment and can skip directly to the following delineator.

An index table may also be added to the beginning of the data string to record additional information about the data string. For example, data strings comprised of fixed, equivalent size data segments may be packed together without a delineator while a table at the beginning of the data records the length, and hence the location, of individual segments within the string. In this way, the computer can jump directly to a segment of data without the need to jump individually from delineator to delineator. One hybrid of such a technique is to rearrange the individual data segments into groups of data segments within the string wherein the segments within each group have similar characters such that the similar characters are written to the database a minimum number of times, reducing repetition and thus saving memory space. In other words, the similar characters in a group of data segments can be removed so that only the stems from which the similar characters were taken remain. The similar characters are then written at the beginning of the group. As the computer reads the data from the group, it reattaches the similar characters to the stem to form the complete segment. In this way, repetitive data which otherwise would take up space in the database is minimized.

Therefore, compression not only compacts data into dense strings, but also prepares the data strings for receiving additional data which may be subsequently generated by the computer. This additional data can be inserted directly into the strings themselves and/or at the beginning of the data strings. The additional data can serve to record information about the data to which it is attached. Furthermore, the additional data can further be used as delineators, and, most importantly, as a means for linking the data with other files within the database.

Once the data within the files has been ordered, encoded and compressed, linking can be used to developed the data into an overall file structure which relates the files to one another. Linking results in a "loose" data structure in which all of the data files are related to one another. This is achieved primarily by generating and inserting pointers, discussed above, and data tables which generally contain information about the data to which they are appended. Although the numeric pointers are inserted in this step, they will remain elastic in value since the actual physical addresses of the files have not yet been assigned. The pointers serve two functions. First, they can point to an address within their corresponding data string. For example, a pointer inserted at the beginning of a string consisting of equal length segments can track the bit length of the segments so that the computer can skip directly to the address of the desired data. Alternatively, a pointer inserted at the beginning of a segment can track the bit length of its segment so that the computer can know haw many bits to skip before the next pointer is reached. The second function of the pointers is to direct the computer to addresses within other files. In this way, the computer can move directly from one file to another.

The use of pointers results in an execution time savings by reducing the number of disk reads the computer must make to move from one data file to the next. The number of disk reads is reduced because the pointers contain physical addresses instead of logical addresses. In other words, the pointers direct the computer to specific physical locations, i.e., track and sector, within the database. This allows a computer to move to a specific location in a single disk read and find all of the data that is needed. The other steps described herein are necessary because they process, prepare and write the data to the database in a manner that will allow the use of these physical addresses. In contrast, the use of logical addresses often requires several disk reads to locate all of the data within a single file. This is primarily due to the manner in which the data within the file is written to the database. Typically, for large files, no single area of the database is available to store all of the data so that it is physically adjacent. Instead the data is broken up and written to multiple areas of the database. A file allocation table (FAT) is required to track not only the address of each of these areas, but also the logical order in which the data was written to theses areas. Therefore, each time the computer is directed to read a logically stored file, the computer must first execute a read of the FAT before moving to the address of the file. However, through the use of physical addresses, the method of the current invention eliminates the need for these additional read and, therefore, an execution time savings is realized.

As explained above, index tables can also be inserted during the compression step and serve a function similar to pointers. These tables can be utilized keep track of information within a string, such as characteristics of the data itself, and serve in much the same way as internal string pointers do, directing the computer to certain addresses within the string to which the table is attached. For example, data strings comprised of fixed, equivalent size data segments may be packed together without a delineator while a table at the beginning of the data records the length, and hence the location, of individual segments within the string. Unlike external string pointers, the data in these tables can be fixed since they are describing characteristics of the data itself as opposed to addresses which have yet to be determined. In this way, the computer can jump directly to a segment of data without the need to jump individually from delineator to delineator.

Once data for the pointers and tables has been generated to form a cohesive data structure, the data is partitioned into blocks to optimize available memory space. Partitioning determines the exact physical address for each file and in effect "firms up" the loose data structure described in the previous step. Partitioning can be utilized to determine the potential physical memory address for a files' data by organizing the data into elements of the database to take advantage of the physical limitations of memory media 12 and thus minimize the number of head seeks required to retrieve a file while maximizing the amount of data retrieved in each head seek. In other words, the processing step prepares the data for receiving additional data, the linking step inserts flexible pointers and data tables, and the organizing step determines the final value of the pointers based on optimization of the physical memory space available on the database. More specifically, this step organizes the data into blocks which must be sufficiently inclusive to allow all of the data in a single string to be read in a single media storage read, yet small enough to optimize the available physical memory space. Furthermore, the data must be written to the database in a manner that minimizes read executions. Ideally, it is desirable to have strings of data that exactly fill a given memory space, however, practically, these two factors must be optimized. Therefore, the computer must determine break points in the data so that a given memory space is optimally filled, yet all of the data within a particular string remains together. For example, consider a database divided into tracks and sectors. This step will arrange data so that as many strings of data as possible are written to a single track without splitting any string of data. Therefore, a compressed string of data which is made up of individual strings will only be broken between two unrelated individual strings of data.

Additionally, files must be written to the database so that those files which are sequentially contiguous are written to areas of the database that are physically contiguous. In this way, jump times from one block of data to the next are minimized. Therefore while the physical location of individual strings is being determined, the overall relationship of individual files within the file structure must be maintained.

Finally, once the physical locations of the files have been determined based on optimization of the above variables, the pointer addresses are fixed and the all of the data is written to the database. Simultaneously, reference tables are generated and interspersed with the data blocks wherein the reference tables track the physical location of related data, obviating the need for additional disk reads and thus speeding up the overall retrieval process. These tables allow data within individual blocks to be self-contained so that the computer can move to the next sequential data address without the need to first access another external memory map or reference table. These table are inserted at the beginning or end of each physical memory segment, such as a track, and indicate where each string begins on its corresponding segment.

Once the above described method has been utilized to compress data and write data to a memory media, the data is easily retrieved by a computer with even the most rudimentary capabilities. The speed with which the retrieving computer reads the data is enhanced due to the use of physical locations, pointers and tables. Encoded data is easily reconstructed, expanded and re-converted to ASCII form as the data is needed. Further, the amount of data which is now available to the retrieving computer is increased because of the manner in which the data has been encoded, compressed and optimally written to the memory media.

In one preferred embodiment, the method and apparatus of the present invention is utilized to process a paint formula database, shown in FIG. 2, which contains paint names and formulas for use on computers with only rudimentary computing capabilities, such as second computer 14 of FIG. 1. The paint formula structure contains three general files: paint notation file 20, paint name file 22 and tinting formula file 24. Paint notation file 20 consists of nine-character, fixed-length strings, each string being referred to individually as a "paint notation". As is shown in FIG. 3, each paint notation 28 is composed of a numeric character pair 29, an alphabetic character pair 31 and numeric character string 33 consisting of five additional numeric characters. Only nine alphabetic character pairs are used in the paint notations. The paint notations within notation file 20 are serial numbers which are used to designate the location of any particular color within the available paint spectrum. Paint name file 22 consists of variable length strings, each string 38 being referred to individually as a "paint name". Each paint name 38 is composed of up to 17 alphabetic characters. Paint names within paint name file 22 fall into two categories, the primary name and the secondary names, whose significance will become apparent. Tinting formula file 24 contains individual color formula strings, wherein each color formula string 52 consist of from one to four colorants selected from a field of nine available colorants. The colorants are mixed with a base to produce the desired color. Additionally, the volume for each colorant is included in the tinting formula for each color, wherein the volume can range from 1/64 of an ounce up to 16 ounces, increasing in 1/64 increments. The type of base selected determines the characteristics of the paint that is being mixed, i.e., latex, enamel, acrylic, outdoor, indoor, glossy, semi-gloss, etc. Hundreds of paint bases or lines are currently available.

With reference to FIG. 1, all of the information described above is written in ASCII form to the database of first computer 10. Before files 20, 22 and 24 can be written to memory media 12, they must be processed and linked using the method of the present invention. More specifically, the data within each file is first ordered and grouped based in logical sequences. Turning to FIG. 3, the paint notations of paint notation file 20 are ordered numerically based on numeric character pair 29. Additionally, because each paint notation 28 may be represented in multiple paint lines, each notation 28 is likely to have multiple paint formulas associated with it. Therefore, for each paint notation 28, a formula group 53 (see FIG. 5) is formed in which the members of formula group 53 represent all the possible formulas that exist for the particular paint notation 28. In this way, color formulas are ordered based on their correlation to the paint notations. For example, all of the available lines for the notation which designates "fire engine red" are grouped together. This color may be available in several different lines. Each of those lines has a unique formula consisting of up to four colorant which are added to the base paint for that line. When the paint notations are arranged, all of the line formulas for each notation are also grouped together. Within each formula group 53, each formula 52 is further sorted into a predetermined order based on all of the possible paint lines in which a formula could potentially exist. Simultaneously, a paint line table 50 (see FIG. 5) is generated for each formula group 53 and appended to its corresponding formula group. Paint line table 50 indicates whether a formula is available in a particular paint line.

Figure 4:
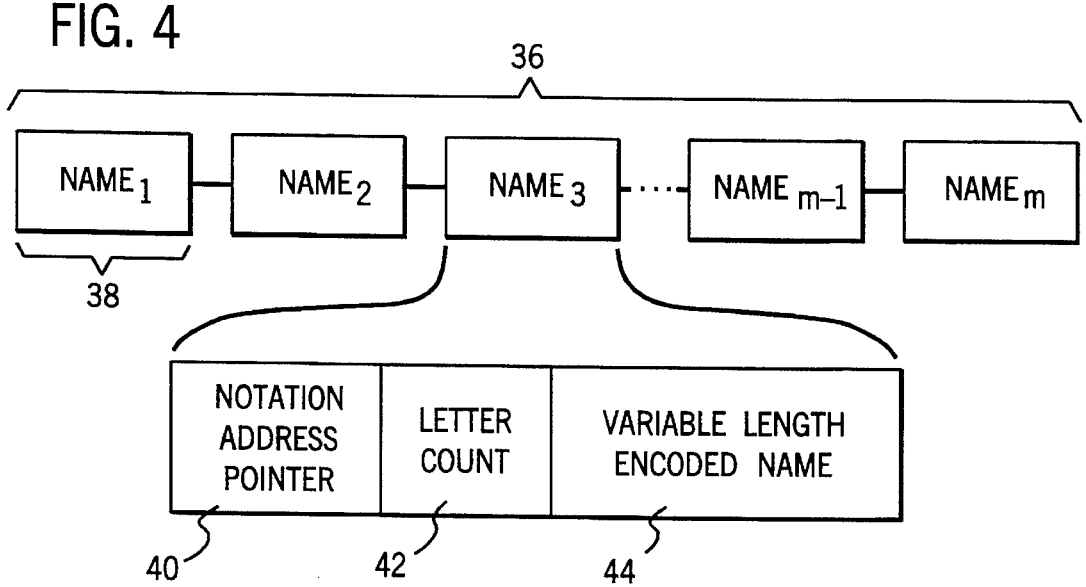
FIG. 4 is a block diagram of the paint name table structure.

Turning to FIG. 4, each paint name 38 is alphabetically ordered. Additionally, an index table is generated which correlates each paint name 38 with a paint notation 28.

After the data within each file has been sequentially ordered, the data is converted from ASCII form to a more efficient binary form, using conversion tables or formulas and BCD. As will be explained below, conversion of each paint notation 28 from ASCII form to a encoded binary form results in a five byte per notation savings. For each paint notation 28, two types of conversion are utilized. Numeric character pair 29 and numeric character string 33 are converted to BCD and alphabetic character pair 31 is converted using a conversion formula. Those skilled in the art will understand that in lieu of a conversion formula, a conversion table can be generated by applying the conversion formula. All numeric characters are converted from ASCII form which requires eight bits per number to BCD form which requires only four bits per number, a bit for bit savings of one-half. Since only nine possible letter pairs exist for alphabetic character pair 31, each letter pair can be assigned a number ranging from zero to eight. Each of these numbers can be represented in binary form using only a four bit binary number. Since the corresponding ASCII letter pair would require 16 bits per letter pair, then a savings of 12 bits per letter pair. In summary, each notation 28 stored in ASCII requires 72 bits, i.e., eight bits per character times nine characters, which is equivalent to nine bytes, while each notation 28 stored in encoded form requires only 32 bits, i.e., four bits per character times eight characters, which is equivalent to four bytes. Therefore, by converting paint notations stored in ASCII form to encoded form, a savings of five bytes is realized.

Conversion of paint names from ASCII form to encoded form is most easily accomplished by a conversion table. In the preferred embodiment, a code table is created wherein each letter of the alphabet is represented by a number beginning with zero and ending with 25, such that "a=0", "b=1", "c=2"..."y=24" and "z=25". The number 25 can be represented in binary form by a binary number containing five bits. Therefore, by equating each alphabetic character with a decimal number and converting that number to its binary equivalent, a character which would require eight bits of memory in ASCII form can be stored in only five bits in encoded form. This is equivalent to a three bit per character savings. Furthermore, it is important to note that a five bit binary number can be used to represent any decimal number up to the decimal number 32. However, the conversion table described herein only assigns corresponding alphabetic characters to the decimal numbers zero through 25. Therefore, the decimal numbers 26 through 32 can also be assigned characters without sacrificing any of the savings achieved by encoding. Typically these characters are punctuation characters, such that a period equals 26, a comma equals 27, a hyphen equals 28, etc.

Figure 5:
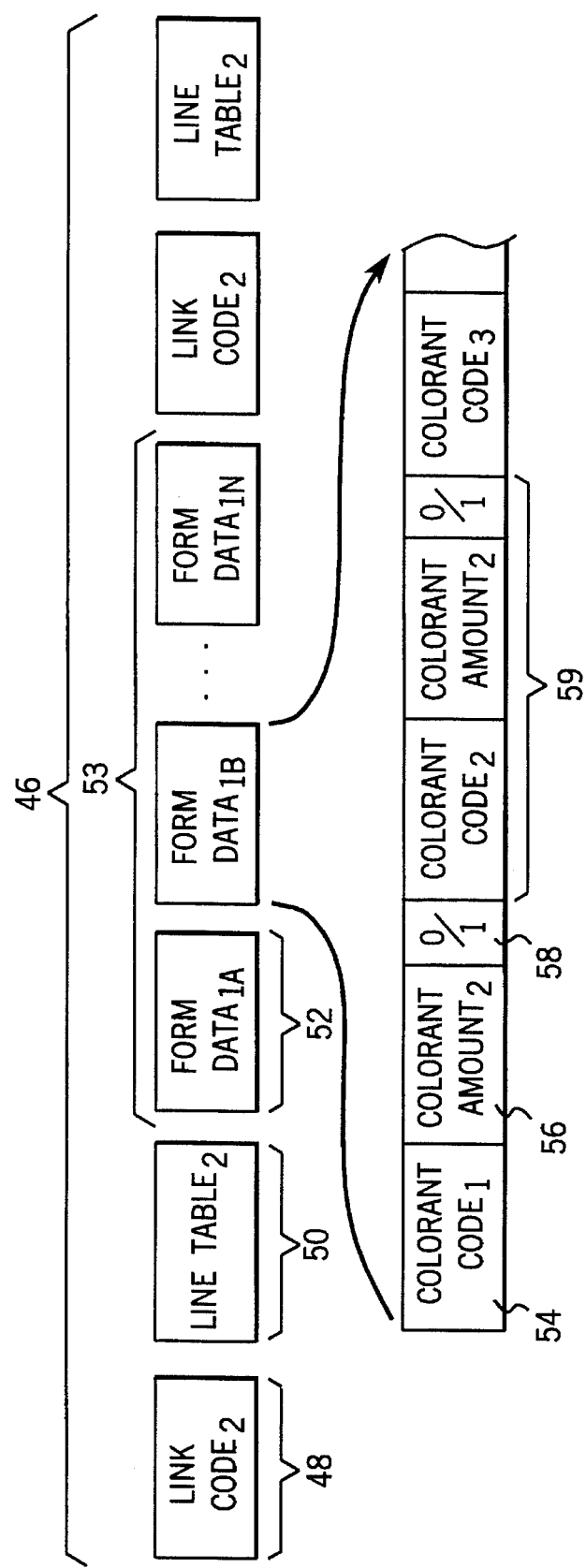
FIG. 5 is a block diagram of the paint formula table structure.

As was mentioned above, each formula 52 consists of from one to four colorant formulas. FIG. 5 shows the components of an individual colorant formula 59 having a colorant code 54 and a colorant volume 56. Additionally, each colorant formula 59 contains a one bit counter 58 which is used to determine the number of colorants for each formula and is further explained in the preceding paragraphs. Turning first to the colorants, there are nine possible colorant codes available for mixing with a base. Creating a conversion table, each colorant can be represented by a decimal number ranging from zero to eight. Therefore, as explained above, each colorant can be encoded and represented by a four bit binary number. The colorant volume 56 can range from 1/64 ounce to 1024 ounces. The decimal number 1024 can be represented in binary by an eleven bit binary number. Therefore, each colorant formula 59 requires a total of 16 bits, or two bytes, and the greatest possible bit-count required for an entire formula 52 is 64 bits, or eight bytes.

Additionally, the database may contain a scaling formula for increasing or decreasing the colorant volume to accommodate different volumes of product. For example, a formula would decrease the colorant volume by an appropriate amount if the colorants are to be combined with a tinting volume base of one quart as opposed to the volumes above which are intended to be mixed with one gallon of base.

Once the data for each file has been encoded, it is then compressed into continuous strings of data. During this process, the data is also conditioned to receive additional data which is generated by first computer 10 in subsequent steps. Turning first to paint notation file 20, encoded notations are arranged into a single, sequential-ordered notation string 26 as is shown in FIG. 3. Before the paint notation data is actually packed together, however, pointers are added to the beginning and end of each notation string 26. Name address pointer 30, appended to the beginning of each notation string 28, is used to link a particular notation to a particular name. Similarly, formula address pointer 34, appended to the end of each notation string 28, is used to link a particular notation to a particular formula group 53. Although the actual value for these pointers are generated by subsequent steps, the effect of this step is to reserve space in compressed notation string 26 for these values. Name address pointer 30 and formula address pointer require three bytes which results in a total byte count for each notation 28 of seven bytes, i.e., three bytes for the pointers plus four bytes for the encoded notation.

Encoded names are also put into sequential order and packed into a single name string 36. Again, a pointer, designated as notation address pointer 40, is appended to the beginning of each paint name 38. The actual address for pointer 40 is generated in the preceding steps by first computer 10. Additionally, letter count 42 is appended to the beginning of each paint name 38. Letter count 42 is used to keep track of the length of each name since the length of each individual paint name is variable. This is in contrast with each paint notation 28 which is of fixed length and therefore does not require such a counter. The value of letter count 42, unlike the pointers discussed herein, can be generated immediately and is not reliant upon other steps in the process. Letter count 42 will allow subsequent computers, such as second computer 14, to skip to the beginning of each paint name 38.

Encoded formulas for each color are packed sequentially into a continuous color formula string 46. In this step, several forms of additional data are contemplated. Each formula group 52 is comprised of a string of paint formulas. Each paint formula 52 is further comprised of from one to four colorant formulas. In compressed form, individual paint formulas and their corresponding colorant formulas would be difficult to distinguish from other paint formulas. Therefore, it is necessary to insert a means for distinguishing between each paint formula within a formula group. As discussed above, counter 58 is used to determine the number of colorants for each formula. Additionally, counter 58 serves to delineate between paint formulas within a formula group. For any given formula group, if the value of counter 58 is set to zero, then the colorant formula which immediately follows counter 58 is part of the preceding paint formula. However, if counter 58 is set to one, then the colorant formula 59 which immediately follows counter 58 is the beginning of a new paint formula for the same color but in a different paint line. Once counter 58 has been set for each colorant formula 59, then the colorant formulas are packed together to form formula group 53.

As previously mentioned, however, a formula may not exist for each available paint line. Therefore, it is necessary to append paint line table 50 to the beginning of each color formula group 53. Paint line table 50 will allow second computer 14 to make to determinations. First, whether a formula exits for a particular paint line, and second, the location of that formula within the formula group. In other words, paint line table 50 acts as an internal pointer, correlating the packed formulas for a particular color with the available paint lines.

The last form of additional data which is contemplated in this step is data used to link formula file 24 with notation file 20 and name file 22. This data is represented by formula link 48 and is appended to the beginning of the line tables. Although the actual values for the formula links are not generated in this step, the position for the data is created as each line table 50 and formula group 53 are compressed into formulas string 46.

Once the individual files have been ordered, encoded and compressed, the next step is to relate paint notation file 20, paint name file 22 and paint formula file 24 into a general structure as is shown in FIG. 1. Although second computer 14 can access data by entering either paint notation file 20 or paint name file 22, the heart of the system is paint notation file 20.

Paint name file 22 and paint formula file 24 are both linked by way of notation file 20. The two pointers, name address pointer 30 and formula address pointer 34, of a paint notation 28 essentially link paint name file 22 and paint formula file 24 by way of paint notation file 20. Name address pointer 30 provides the physical address of the "preferred" name while paint formula address 34 provides the physical address of the beginning of the formula for that particular notation.

The concept of a preferred name is used due to the possibility that a color may potentially be described by multiple names, especially for colors which have been assigned new names. The preferred name is the name which is chosen to be the single name referenced by name address pointer 30. Typically the preferred name is the most recent name assigned to a color, while the other names which may be associated with a color are typically old names for the color. In the preferred embodiment, each preferred name as well as all of the other names for any given color contain a notation address pointer 40 which links the name with a specific notation 28. However, name address pointer 30 contained in a notation 28 only points to the address of the preferred name and does not point to the address' of any of the other names. In this way, only the preferred name is associated with a particular color if paint name file 22 is accessed by way of paint notation file 20, yet if paint notation file 20 is accessed by way of paint name file 38, it is possible that several separate addresses, i.e., the address of the preferred name as well as addresses of old names, will point to a specific paint notation address. In other words, if the database is accessed by way of paint notation file 20, then only the preferred color is retrieved. If the database is accessed by way of paint name file 22, then the appropriate paint notation 28 is also retrieved. Furthermore, if an name other than the preferred name is used to enter paint name file 22, then paint notation file 20 will also retrieve the preferred name from paint name file 22.

At the completion of the linking step, three large groupings of data exist. These groupings are paint notation file 20, paint name file 22 and paint formula file 24. The next step is to determine the actual physical address for the data within each file. This is done by breaking the files down into blocks of data and determining the physical location to which these blocks will be written. This process is achieved by optimizing two parameters. First, the blocks must be sufficiently inclusive so that all of the desired data is retrieved in a single disk read. Secondly, the size of the blocks must be sufficiently limited so that an entire block is written to just one track of memory. For example, if data is accessed through paint notation file 20, the data in paint formula file 24 should be blocked and written to memory media 12 so that a single disk read by second computer 14 will retrieve the entire formula group 53 associated with the particular notation selected. Thus, organization of each formula group 53 must be such that the entire formula group is written to a single track. Additional subsequent formula groups may also be written to this track as long as the entire group can be written to the track. If the track is not large enough to write an entire formula group, then the group will be written to another available track.

The final step in the process is to generate the actual physical address locations and to write the data to memory media 12. Once this data is generated, name address pointer 30, formula address pointer 34 and notation address pointer 40 can be filled in. Up to this point, first computer 10 has manipulated paint notation file 20, paint name file 22 and paint formula file 24 based on a series of rules broken down into steps. Most of these rules require that the data within each file be shifted and altered in a very fluid way. Since all of the data is potentially moved, it has been necessary for the computer to keep track of the relational location of all the data. Once the relational location and the physical location of the data coincide in the optimization step, the variable data, such as the pointers, can be fixed.

Once the files have been written to memory media 12, second computer 14 can easily reconstruct the data by reversing the compression, encoding and organization steps. Additionally, the manner in which the data has been written to memory media 12 increases the speed with which second computer 12 can reconstruct the data. This is due to the use of the pointers and tables which were generated and interspersed throughout the data.

Turning back to FIG. 1, the process by which a paint formula is retrieved is described. The process can be initiated either by looking up a notation or looking up a paint name. If a paint name is used to access the formulas, a list of available paint names arranged in alphabetical order is presented. Once the name is selected from the list, it is directed to an output device(not shown) such as a display screen or a printer where it can be printed for viewing. In addition, when the name is selected, notation address pointer 40 directs second computer 14 to the physical address on memory media 12 containing the corresponding paint notation within paint notation file 20. The computer jumps to that address and also retrieves the paint notation which is also sent to the output device. When the paint notation address is retrieved, formula address pointer 34 directs second computer 14 to the appropriate address of the corresponding line table 50 and formula group 53. Based on the information in line table 50, second computer 14 can move through formula group 53 until the desired color formula is found. The appropriate formula is also printed to the output device. Additionally, if the name used to look up the notation is not the preferred name, then name address pointer 30 will direct second computer 14 back into paint name file 22 to the address of the preferred name which will also be sent to the output device.

If a paint notation is used to access the formulas, a list of available paint notations arranged in alpha-numeric order is presented. Once a particular notation is selected, name address pointer 30 will direct second computer 14 to the address of the preferred paint name and formula address pointer 34 will direct second computer 14 to the address of the appropriate line table and formula group.

In another embodiment, the output device can be a paint mixing machine which will interpret the data and automatically mix the appropriate colorants and volumes with the specified base.

In yet another embodiment, the output device can be a label printer which will interpret the data and print a label containing the paint name, paint notation and paint formula for affixing to paint containers.

What is claimed is:

1. A method for compressing data files for storage on a memory media comprising the steps of:
   a. processing the data within each file, wherein the step of processing comprises
      (1) ordering the data;
      (2) encoding the data;
      (3) packing the encoded data to form data strings;
   b. linking the files to form an overall data structure wherein the relative relationship between files is determined;
   c. partitioning the data strings within each file to form data blocks and determine the physical location of said blocks on the memory media so that the available memory of the memory media is optimized, while the relative relationship between files is maintained;
   d. generating reference data within each data block to relate the physical location of said blocks on the memory media; and
   e. writing the data blocks to the memory media.

2. A method for storing data, said data being organized into a first sequence of records on a first database, wherein said data is stored in a second sequence on a second database such that the memory space required to store the second sequence of records is arranged in a manner which increases the speed at which the data can be retrieved, said method comprising the following steps:
   a. ordering the data of each record of said first sequence of records into a predetermined sequence to form data segments;
   b. encoding said data segments into a binary form which requires less memory to store said data on said second database than was required by the data in said first sequence;
   c. compressing the encoded segments of each record into a continuous data string;
   d. linking the data strings by generating and appending additional data to each data string which relates the individual data strings;
   e. generating and appending additional empty data places to each string for receiving location dependent data;
   f. partitioning the data strings into blocks of data based on the physical characteristics of said second database wherein the physical characteristics of the database dictate where the data blocks will be written and which data strings will be included in each block;
   g. generating location dependent data to fill the empty data places of each data string wherein said location dependent data is generated based on the physical location on said second database to which each block is assigned; and
   h. writing the blocks of data to their predetermined locations on said second database.

3. The method of claim 2 wherein the step of ordering is accomplished by arranging the data into related groups.

4. The method of claim 3 wherein the groups are numerically related.

5. The method of claim 3 wherein the groups are alphabetically related.

6. The method of claim 2 wherein the data segments are encoded using transformation tables which correlate characters to binary numbers.

7. The method of claim 2 wherein the data segments are encoded using binary coded decimal.

8. The method of claim 2 wherein the step of compressing encoded data segments further comprises the step of generating and appending a delineator between contiguous data segments.

9. The method of claim 8 wherein the delineator functions as a pointer.

10. The method of claim 8 wherein the delineator contains information about the subsequent data segment to which the delineator has been appended.

11. The method of claim 2 further comprising the step of generating and appending an index table at the beginning of each data string.

12. The method of claim 11 further comprising the steps of removing equivalent characters from the beginning of each data segment in a data string and recording the equivalent character in the index table.

13. The method of claim 11 further comprising the step of recording in the index table the length of a data segment in a data string when the data string is comprised of equivalent length data segments.

14. The method of claim 2 wherein the step of partitioning is further comprised of the following steps:
   a. determining the break points between data strings; and
   b. organizing related blocks of data on the database so that the blocks are physically adjacent.

15. A method for storing data, said data being organized into a first sequence of records on a first database and stored in a first binary form, wherein said data is stored in a second sequence on a second database such that the memory space required to store the second sequence of records is arranged in a manner which increases the speed at which the data can be retrieved, said method comprising the following steps:
   a. ordering the data of each record of said first sequence of records into a predetermined sequence to form data segments wherein the data segments are arranged based on common characteristics of the data segments;
   b. repeating the process of step (a) within each data segment such that each data segment is characterized by sub-segments arranged based on common characteristics of the data strings which comprise each segment.
   c. encoding each data segment into a second binary form which requires less memory to store said data on said second database than was required by the data in said first binary form wherein the second binary form is such that each character is represented by a binary number smaller than would be required to represent the character in another binary form;
   d. inserting a delineator at the beginning of each segment and sub-segment, wherein the value of the delineator allows the delineator to also functions as a pointer or contains information about the subsequent data segment to which the delineator has been appended;
   e. compressing the encoded segments of each record into a continuous data string wherein the delineators separate individual data segments within each continuous data string;
   f. appending an index table at the beginning of each continuous data string;
   g. removing equivalent characters from each data segment within a data string and recording the equivalent characters in the index table;
   h. recording in the index table the length of a data segment in a data string when the data string is comprised of equivalent length data segments;

i. linking the data strings by generating and appending additional data to each data string which relates the individual data strings;

j. appending additional empty data places to each string for receiving location dependent data;

k. partitioning the data strings into blocks of data based on the physical characteristics of said second database such that said second database is optimally filled wherein the physical characteristics of the database are utilized to determine the break points within data strings and the location of each block in said second database such that blocks which have related data are physically located adjacent one another in said second database;

l. generating location dependent data to fill the empty data places of each data string wherein said location dependent data is generated based on the physical location on said second database to which each block is assigned; and m. writing the blocks of data to their predetermined locations on said second database.

16. The method of 15 wherein the step of encoding is further comprised of:

a. representing each alphabetic character by a form which requires a binary number smaller than would be required to represent the character in another ASCII form; and b. representing each numeric character by its binary coded decimal (BCD) equivalent.

17. A system for compressing and retrieving data comprising:

a. a first data storage medium wherein said first storage medium is transportable;

b. a first large database containing data records in a first binary form, wherein said first database requires more memory for its storage than is available on said first data storage medium;

c. a first computer system configured to receive said first data storage medium, said first computer system further comprising:

(1) a second data storage medium, of greater memory capacity than said first storage medium, wherein said second storage medium contains said first large database;

(2) wherein said first computer system is utilized to (a) order the data of each record of said first database into a predetermined sequence to form data segments wherein the data segments are arranged based on common characteristics of the data segments;

(b) repeat the order process within each data segment such that each data segment is characterized by sub-segments arranged based on common characteristics of the data strings which comprise each segment;

(c) encode each data segment into a second binary form which requires less memory to store said data than was required by said data in said first binary form wherein the second binary form is such that each character is represented by a binary number smaller than would be required to represent the character in another binary form;

(d) insert a delineator at the beginning of each segment and sub-segment, wherein the value of each delineator allows the delineator to also functions as a pointer or contain information about the subsequent data segment to which the delineator has been appended;

(e) compress the encoded segments of each record into a continuous data string wherein the delineators separate individual data segments within each continuous data string;

(f) append an index table at the beginning of each continuous data string;

(g) remove equivalent characters from the beginning of each data segment within a data string and record the equivalent character in the index table;

(h) record in the index table of each data string the length of a data segment in a data string when the data string is comprised of equivalent length data segments;

(i) link the data strings by generating and appending additional data to each data string which relates the individual data strings;

(j) append additional empty data places to each string for receiving location dependent data;

(k) partition the data strings into blocks of data based on the physical characteristics of said first data storage medium such that said first data storage medium is optimally filled wherein the physical characteristics of said first storage medium are utilized to determine the break points within data strings and the location of each block in said first storage medium such that blocks which have related data are physically located adjacent one another on said first storage medium;

(l) generate location dependent data to fill the empty data places of each data string wherein said location dependent data is generated based on the assigned physical location of each block on said first storage medium; and (m) write the blocks of data to their predetermined locations on said first storage medium;

d. a second computer system configured to receive said first data storage medium and retrieve data from said first storage medium, wherein said second computer has a smaller computing capacity than said first computer system.

18. The system of claim 17 wherein said second computer system further comprises a printer.

19. The system of claim 18 wherein said second computer system further comprises a means for mixing paint based on data retrieved from said first storage medium.

20. A paint data storage medium for use on a computer system, wherein said storage medium contains a paint storage database which correlates paint names, paint notations and paint formulas, said paint storage database comprising:

a. a color formula table, wherein said color formula table further comprises:

(1) at least one line table which contains the availability of each paint color in each line;

(2) at least one color formula entry for each color in each available line, wherein each color formula entry comprises:

(a) at least one color code;

(b) at least one color amount; and (c) at least one end bit to signify the end of a color formula for a paint line; and (3) at least one link code for pointing to the location of subsequent line tables;

b. a notation table, wherein said notation table further comprises:

(1) notation entries numbered from 1–n, wherein each notation entry comprises:

(a) a name address pointer;
(b) an encoded notation; and
(c) a formula address pointer for pointing to the corresponding color formula entry in said color formula table; and
c. a paint name table, wherein said paint name table further comprises:
  (1) paint name entries numbered 1–m, wherein each paint name entry comprises:

(a) a notation address pointer for pointing to the corresponding notation entry in said notation table;
(b) a variable length encoded name; and
(c) a letter count which corresponds to the number of characters in said variable length encoded name.

* * * * *